(12) United States Patent
Wurm et al.

(10) Patent No.: US 8,830,853 B2
(45) Date of Patent: Sep. 9, 2014

(54) SIGNAL PROCESSING

(75) Inventors: Karlheinz Wurm, Stockholm (SE); Andrei Jefremov, Järfälla (SE); David Zhao, Solna (SE)

(73) Assignee: Skype, Dublin (IE)

( * ) Notice: Subject to any disclaimer, the term of this patent is extended or adjusted under 35 U.S.C. 154(b) by 80 days.

(21) Appl. No.: 13/328,089

(22) Filed: Dec. 16, 2011

(65) Prior Publication Data

US 2013/0058232 A1 Mar. 7, 2013

(30) Foreign Application Priority Data

Sep. 6, 2011 (GB) .................................. 1115386.3

(51) Int. Cl.
*H04L 12/26* (2006.01)
*H04Q 7/00* (2006.01)

(52) U.S. Cl.
USPC .......................................... 370/252; 370/328

(58) Field of Classification Search
USPC ........................... 370/252, 254, 255, 328, 338
See application file for complete search history.

(56) References Cited

U.S. PATENT DOCUMENTS

| | | | |
|---|---|---|---|
| 6,404,776 B1 | 6/2002 | Vools et al. | |
| 6,587,735 B1 * | 7/2003 | Yaguchi | 700/2 |
| 7,002,992 B1 * | 2/2006 | Shaffer et al. | 370/468 |
| 7,376,132 B2 * | 5/2008 | Conway | 370/389 |
| 7,733,772 B2 * | 6/2010 | Hazra et al. | 370/230 |
| 2004/0165783 A1 | 8/2004 | Reynolds et al. | |
| 2005/0268321 A1 * | 12/2005 | Milirud et al. | 725/118 |
| 2006/0121955 A1 | 6/2006 | Shlomot | |
| 2008/0207253 A1 * | 8/2008 | Jaakkola et al. | 455/550.1 |
| 2010/0309851 A1 * | 12/2010 | Aldaz et al. | 370/328 |
| 2013/0034146 A1 * | 2/2013 | Jeong et al. | 375/240.01 |

FOREIGN PATENT DOCUMENTS

| | | |
|---|---|---|
| EP | 2093890 | 8/2009 |
| JP | 11328376 | 11/1999 |
| JP | 2002314782 | 10/2002 |
| JP | 2004153769 | 5/2004 |
| KR | 20090059798 | 6/2009 |
| WO | WO-2012100032 | 7/2012 |

OTHER PUBLICATIONS

"Search Report", GB Application No. 1115386.3, (Dec. 24, 2012), 3 pages.
"International Search Report and Written Opinion", Application No. PCT/US2012/054016, (Jan. 2, 2013), 21 pages.

* cited by examiner

*Primary Examiner* — Hong Cho
(74) *Attorney, Agent, or Firm* — Sonia Cooper; Jim Ross; Micky Minhas

(57) ABSTRACT

According to an embodiment, a mobile device includes wireless access circuitry configured to access a wireless communication network; a processor for executing a communication client application to conduct a packet-based call with a remote device via a channel established over the wireless communication network, the communication client application configured to monitor at least one network parameter; a hardware processing module selectively operable to implement a processing function; a software processing module selectively executable to implement said processing function; and a selection mechanism for supplying the call to one of the hardware processing module and software processing module based on the at least one monitored network parameter.

31 Claims, 8 Drawing Sheets

SIGNAL PROCESSING

RELATED APPLICATION

This application claims priority under 35 U.S.C. §119 or 365 to Great Britain Application No. GB 1115386.3, filed Sep. 6, 2011. The entire teachings of the above application are incorporated herein by reference.

TECHNICAL FIELD

The present invention relates to processing signals during a call conducted on a mobile device.

BACKGROUND

Some communication systems allow the user of a device, such as a personal computer, to conduct voice or video calls over a packet-based computer network such as the Internet. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as instant messaging ("IM"), SMS messaging, file transfer and voicemail.

With increasing mobile bandwidths, there is increasing interest in providing packet-based video calls via client applications running on mobile devices such as Internet-enabled mobile phones. These mobile devices comprise transceivers such as short-range RF transceivers operating on one or more unlicensed bands for accessing the Internet via wireless access points (e.g. of Wi-Fi access points of WLAN networks), and/or cellular transceivers operating on one or more licensed bands for accessing the Internet via a packet-based service of a cellular network such as GPRS (General Packet Radio Service) or HSPA (High Speed Packet Access).

In a current "Smartphone", software based encoding according to the H.264 standard is implemented, which provides good quality encoding but reduces battery life.

SUMMARY

According to a first aspect of the invention there is provided a mobile device comprising: wireless access circuitry configured to access a wireless communication network; a processor for executing a communication client application to conduct a packet-based call with a remote device via a channel established over the wireless communication network, the communication client application configured to monitor at least one network parameter; a hardware processing module selectively operable to implement a processing function; a software processing module selectively executable to implement said processing function; and a selection mechanism for supplying the call to one of the hardware processing module and software processing module based on the at least one monitored network parameter.

Preferably, the processing function is a codec function on one of a video or audio call.

Preferably, the at least one monitored network parameter is at least one of: channel bit rate; channel end-to-end transmission delay; channel packet loss rate; and channel packet loss burstiness.

The selection mechanism may be further responsive to capabilities of the remote device to select between the hardware processing module and the software processing module. Preferably, the selection mechanism comprises: a switch configured to receive an input signal; and a controller configured to receive the at least one monitored network parameter and supply a control signal to said switch, the control signal based on the at least one monitored network parameter, wherein the control signal controls the switch to output the input signal to either the hardware processing module or the software processing module to be processed.

The software processing module may be implemented by code executed on the means for executing the communication client application.

Preferably, monitoring the at least one network parameter is at least one of a transport layer function and an application layer function executed by the processor for executing the communication client application.

The hardware processing module and the software processing module may both comprise a video encoder and a video decoder. The mobile device may further comprise means for capturing real time video data, said means supplying the input signal in the form of an unencoded video signal. Alternatively, the input signal may be an encoded video signal transmitted to the mobile device via said channel by the remote device.

The hardware processing module and the software processing module may both comprise an audio encoder and an audio decoder. The mobile device may further comprise means for capturing audio data, said means supplying the input signal in the form of an unencoded audio signal. Alternatively, the input signal may be an encoded audio signal transmitted to the mobile device via said channel by the remote device.

In some embodiments, the processing function is a security function.

Preferably, the wireless communication network is the Internet.

Preferably, the mobile device is one of: an Internet-enabled mobile telephone; a handheld game console; a personal digital assistant (PDA); a tablet computer; and a laptop computer.

According to a second aspect of the invention there is provided a method of conducting a packet based call with a remote device via a channel established over a wireless communication network, the method comprising: executing a communication client application to conduct the call and monitor at least one network parameter; and selectively supplying the call to one of a hardware processing module operable to implement a processing function, or a software processing module executable to implement said processing function, based on the at least one monitored network parameter.

Preferably, the method further comprises supplying the at least one monitored network parameter to a selection mechanism configured to supply the call to the hardware processing module or the software processing module.

Preferably, the method further comprises receiving an input signal at a switch of the selection mechanism; receiving the at least one monitored network parameter at a controller of the selection mechanism; and supplying a control signal from said controller to said switch, the control signal based on the at least one monitored network parameter, wherein the control signal controls the switch to output the input signal to either the hardware processing module or the software processing module to be processed.

Preferably, the method further comprises executing a logical analysis of multiple network parameters.

The controller may control said switch to output the input signal to the hardware processing module to be processed, when: the channel bit rate is greater than, or equal to, a predetermined bit rate threshold, and the channel end-to-end transmission delay is less than a predetermined delay threshold, and the channel packet loss rate is less than a predetermined packet loss rate threshold.

The controller may control said switch to output the input signal to the software processing module to be processed, when the channel bit rate is less than the predetermined bit rate threshold.

The controller may control said switch to output the input signal to the software processing module to be processed, when the channel end-to-end transmission delay is greater than, or equal to, the predetermined delay threshold.

The controller may control said switch to output the input signal to the software processing module to be processed, when the channel packet loss rate is greater than, or equal to, the predetermined packet loss rate threshold.

The method may further comprise receiving a user input to select a configuration mode, said configuration mode corresponding to a set of constant threshold values, wherein the controller controls said switch using said set of constant threshold values.

Preferably, the method further comprises: monitoring a power supply level of a power supply; and adjusting the operation of the selection mechanism based on the power supply level. The thresholds may be varied according to the power supply level of the power supply.

Preferably, the controller controls said switch using a first set of constant threshold values when the power supply level of the power supply indicates that the mobile device is connected to an external power source.

Preferably, the controller controls said switch using a second set of constant threshold values when the power supply level of the power supply is greater than, or equal to, a predetermined power supply threshold, and the controller controls said switch using a third set of constant threshold values when the power supply level of the power supply is less than the predetermined power supply threshold.

According to a third aspect of the invention there is provided a computer program product embodied on a non-transitory computer-readable medium and comprising code configured so as when executed on a mobile device to perform any of the method steps described hereinabove.

BRIEF DESCRIPTION OF THE DRAWINGS

For a better understanding of the present invention and to show how it may be put into effect, reference is now made by way of example to the accompanying drawings in which.

DETAILED DESCRIPTION

Figure 1:
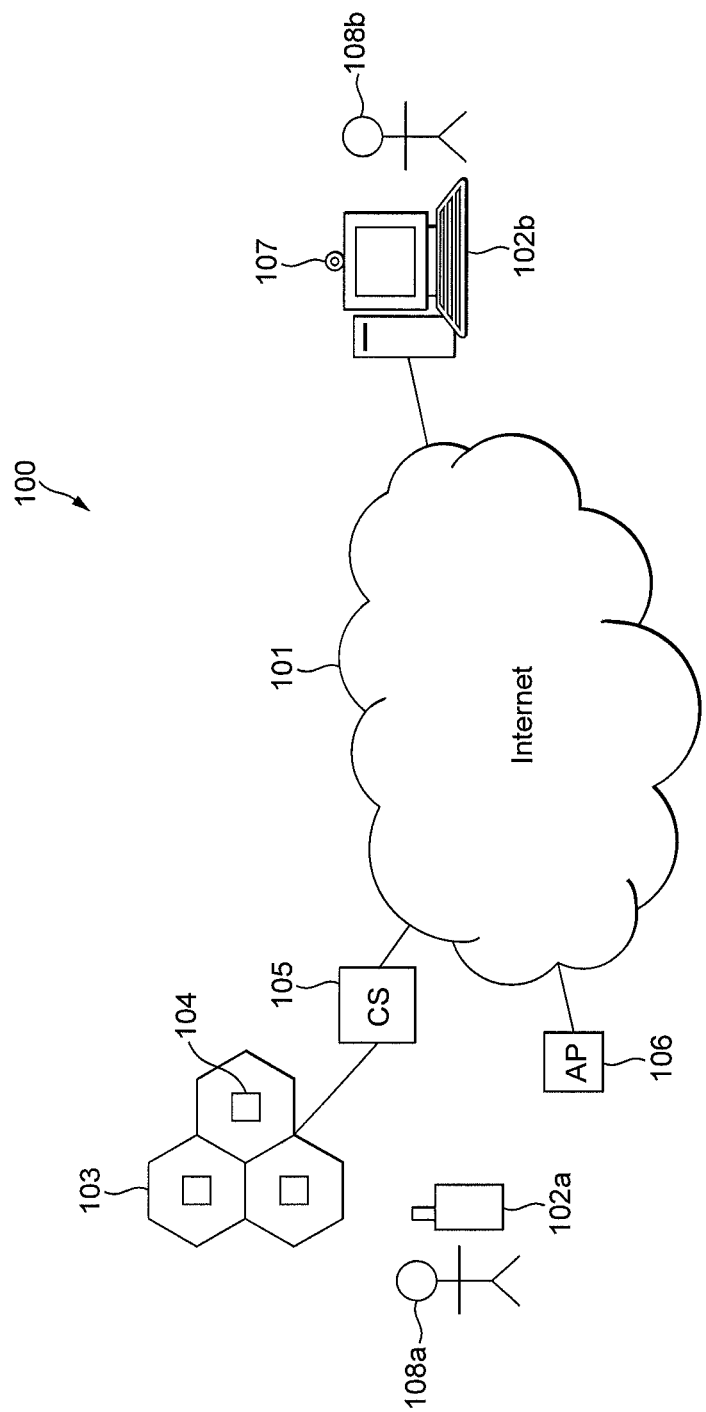
FIG. 1 is a schematic representation of a communication system.

FIG. 1 is a schematic illustration of a communication system 100 comprising a packet-based network 101 such as the Internet, and a mobile cellular network 103. The mobile cellular network 103 comprises a plurality of base stations 104 (sometimes referred to as node Bs in 3GPP terminology). Each base station 104 is arranged to serve a corresponding cell of the cellular network 103. Further, the packet-switched network 101 comprises a plurality of wireless access points 106 such as Wi-Fi access points for accessing the Internet. These may be the access points of one or more wireless local area networks (WLANs).

A plurality of user terminals 102 are arranged to communicate over the networks 101 and/or 103. At least one of the user terminals 102 comprises a mobile device such as an Internet-enabled mobile phone, and others of the user terminals 102 may comprise for example desktop or laptop PCs.

Figure 2A:
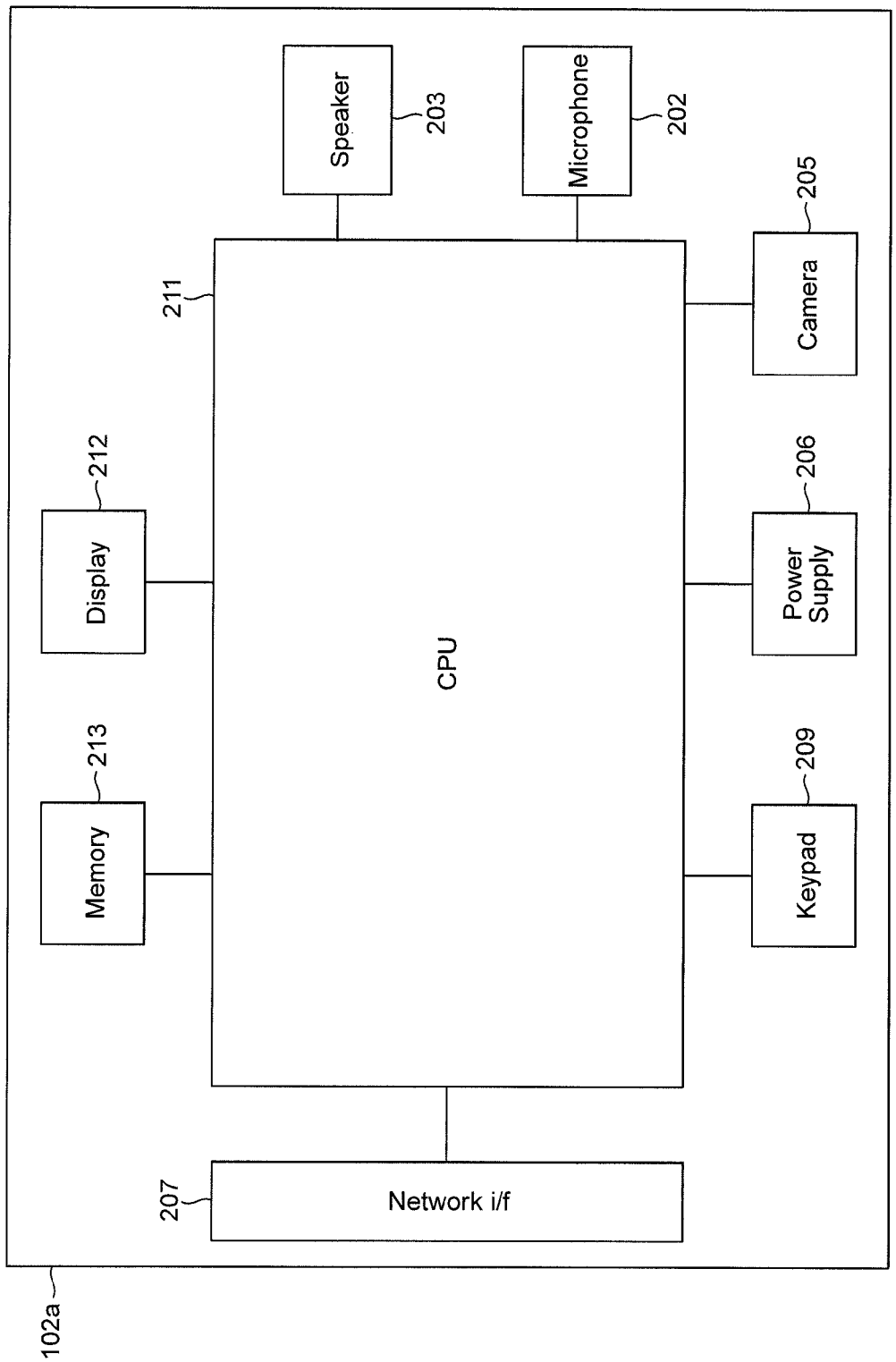
FIG. 2a is a schematic representation of a known mobile terminal.
Figure 2B:
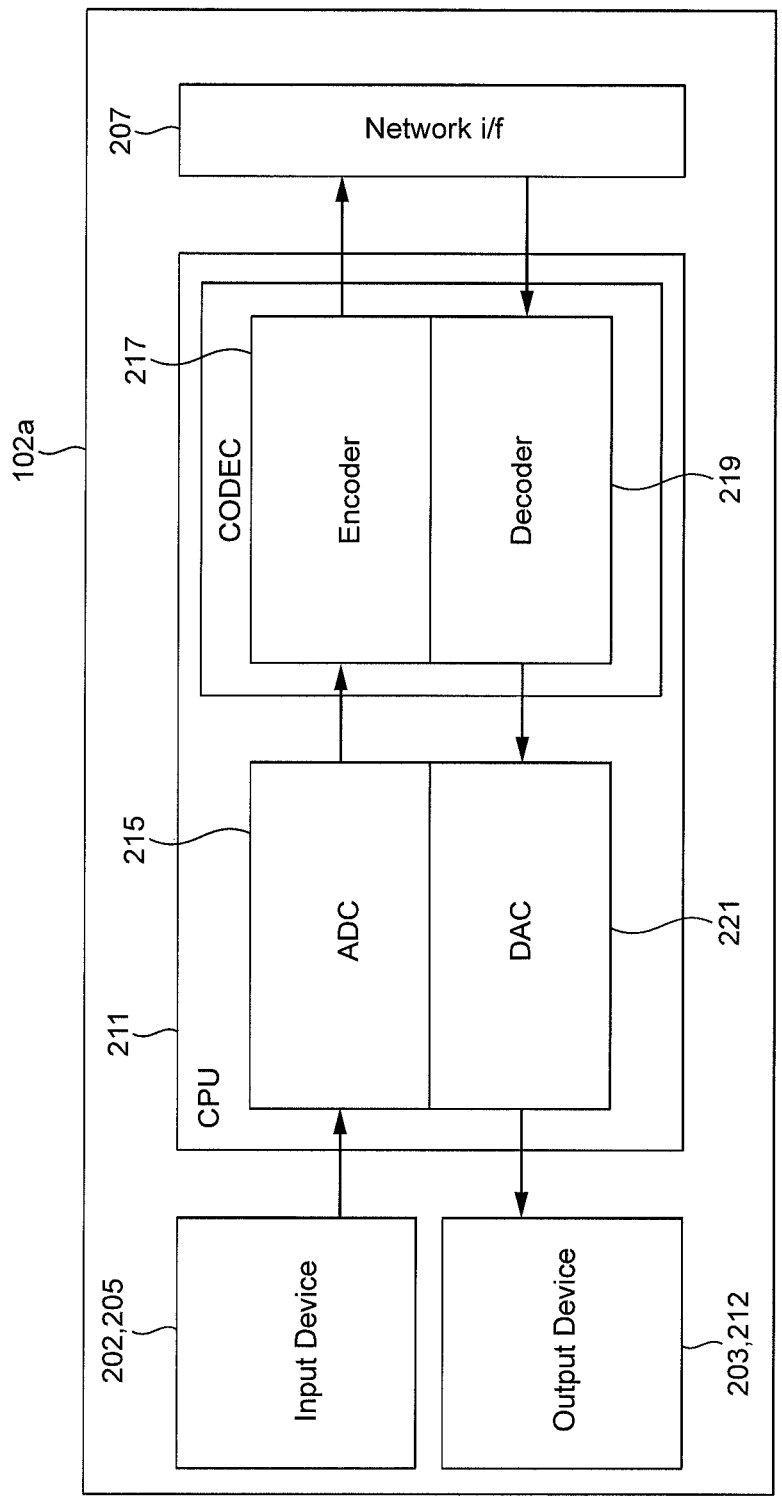
FIG. 2b is a schematic block diagram of a known mobile terminal.

An example mobile device 102a is shown schematically in FIGS. 2a and 2b. The mobile device 102a comprises a processing apparatus in the form of one or more processor units (CPUs) 211 coupled to a memory 213 storing a communication client application. The processor 211 is also coupled to: a microphone 202, a speaker 203, camera 205, a power supply 206, one or more RF transceivers 207, a keypad 209, and a display 212.

The one or more transceivers 207 enable the mobile device 102a to access the one or more networks 101 and/or 103. For example, mobile device 102a may comprise a cellular wireless transceiver for accessing the mobile cellular network 103 via the base stations 104, and/or a wired or wireless modem for accessing the Internet 101. In the case of a wireless modem, this typically comprises a short-range wireless transceiver (e.g. Wi-Fi) for accessing the Internet 101 via the wireless access points 106.

Access to the Internet 101 may also be achieved by other means such as GPRS (General Packet Radio Service) or HSPA (High Speed Packet Access). At a higher level of the cellular hierarchy, the cellular network 103 comprises a plurality of cellular controller stations 105 each coupled to a plurality of the base stations 104. The controller stations 105 are coupled to a traditional circuit-switched portion of the mobile cellular network 103 but also to the Internet 101. The controller stations 105 are thus arranged to allow access to packet-based communications via the base stations 104, including access to the Internet 101. The controller stations 105 may be referred to for example as Base Station Controllers (BSCs) in GSM/EDGE terminology or Radio Network Controllers (RNCs) in USTM or HSPA terminology.

The memory 213 may comprise a non-volatile memory such as an electronic erasable and programmable memory (EEPROM, or "flash" memory) coupled to the processor 211. The memory stores communications code arranged to be executed on the processor, and configured so as when executed to engage in communications over the Internet 101 and/or cellular network 103. The communications code preferably comprises a communication client application for performing communications such as voice or video calls with other user terminals 102 over the Internet 101, via a short-range wireless transceiver 207 and wireless access points 106, and/or via a cellular wireless transceiver 207, base stations 104 and controller stations 105 of the cellular network 103 as discussed above. However, one or more of the user terminals 102 involved could alternatively communicate via a wired modem, e.g. in the case of a call between a mobile terminal and a desktop PC.

In this manner, a mobile device 102a is arranged to establish a call with another, remote terminal 102b via the Internet 101 (or other packet-based network). In the example shown the remote terminal 102b is a desktop computer, but in other embodiments could be another mobile device.

Particularly, if the video calling feature is enabled by the user, the call comprises a live video call between the mobile device 102a and 102b. The video call comprises an exchange of signals captured in real-time by the devices 102a and 102b, transmitted in the form of IP packets via the Internet 101.

The exchanged signals may comprise both incoming and outgoing video signals, although alternatively the video call need not be bidirectional and could comprise video transmitted in only one direction from only one of the user devices 102.

The exchanged signals may comprise a "raw" (unencoded) outgoing video signal captured by the camera 205 of the mobile device 102a, converted to a digital signal by analogue to digital converter (ADC) 215 and encoded by the client at block 217.

When executed the encoder 217 encodes the video signal so as to compress it into a lower bitrate stream, and outputs the encoded signal for transmission via the transceiver 207 and network 101,103 to the remote device 102b.

The exchanged signals may comprise an incoming encoded video signal from the remote terminal 102b that is decoded by the client application on the mobile device 102a at the decoder 219. The decoded video signal may then be converted to an analogue signal using digital to analogue converter (DAC) 221 and output to the display 212.

The exchanged signals may also comprise an incoming encoded audio signal from the remote device 102b for output via the speaker 203 on the mobile device 102a, and/or an outgoing "raw" (unencoded) audio signal captured by the microphone 202 on the mobile device 102a for transmission to the remote device 102b. A generic term that may be used to refer to an encoder and/or decoder is a codec.

Figure 3:
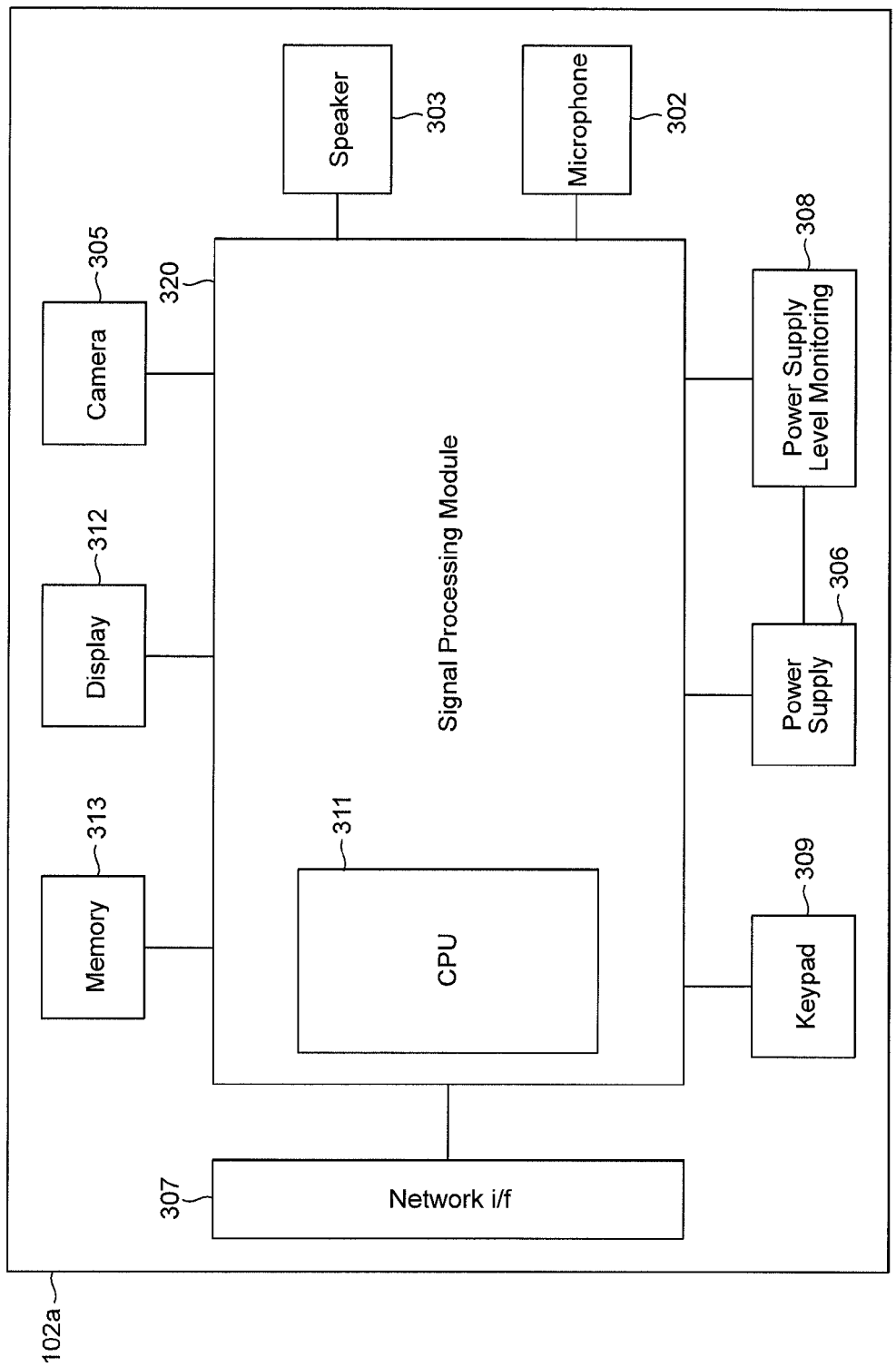
FIG. 3 is a schematic block diagram of a mobile terminal according to the invention.

A mobile device 102a according to the invention is shown schematically in FIG. 3.

The mobile device 102a shown in FIG. 3 comprises a signal processing module 320 which includes a CPU 311 (for implementing a software codec and carrying out other signal processing functions) and a hardware codec. The hardware codec may be implemented on a dedicated chip or may be physically located on the same die as the CPU 311.

The signal processing module 320 is coupled to the same devices that are present in the known mobile device described above with reference to FIGS. 2a and 2b. That is, the signal processing module 320 is coupled to a memory 313 storing a communication client application. The signal processing module 320 is also coupled to: a microphone 302, a speaker 303, camera 305, a power supply 306, one or more RF transceivers 307, a keypad 309, and a display 312.

The signal processing module 320 is further coupled to a power supply level monitoring block 308 that monitors power supply 306. The power supply level monitoring block 308 can take the form of an analogue to digital converter which reads the voltage level of the power supply 306 and converts this to digital data that can be read by the signal processing module 320.

The signal processing module 320 will now be discussed in more detail with reference to FIG. 4. The signal processing module 320 may be used to encode an input signal for transmission over the network 101,103 to remote device 102b during a voice or video call.

An input signal is supplied on line 402 to an encoder switch 404. In operation the input signal may be an audio signal output from microphone 302 and/or the input signal may be a real-time video signal captured by camera 305.

The encoder switch 404 also receives a control signal 412 from control block 430. The encoder switch 404 operates to output the received input signal on either line 406 to a hardware codec 405, or on line 408 to a software codec 410 in dependence on control signal 412. The selected one of the hardware codec 405 and software codec 410 provides an encoded output signal on line 414. The encoded output signal 414 may be supplied to the network interface 207 for transmission over the network 101,103 to remote device 102b.

Figure 4:
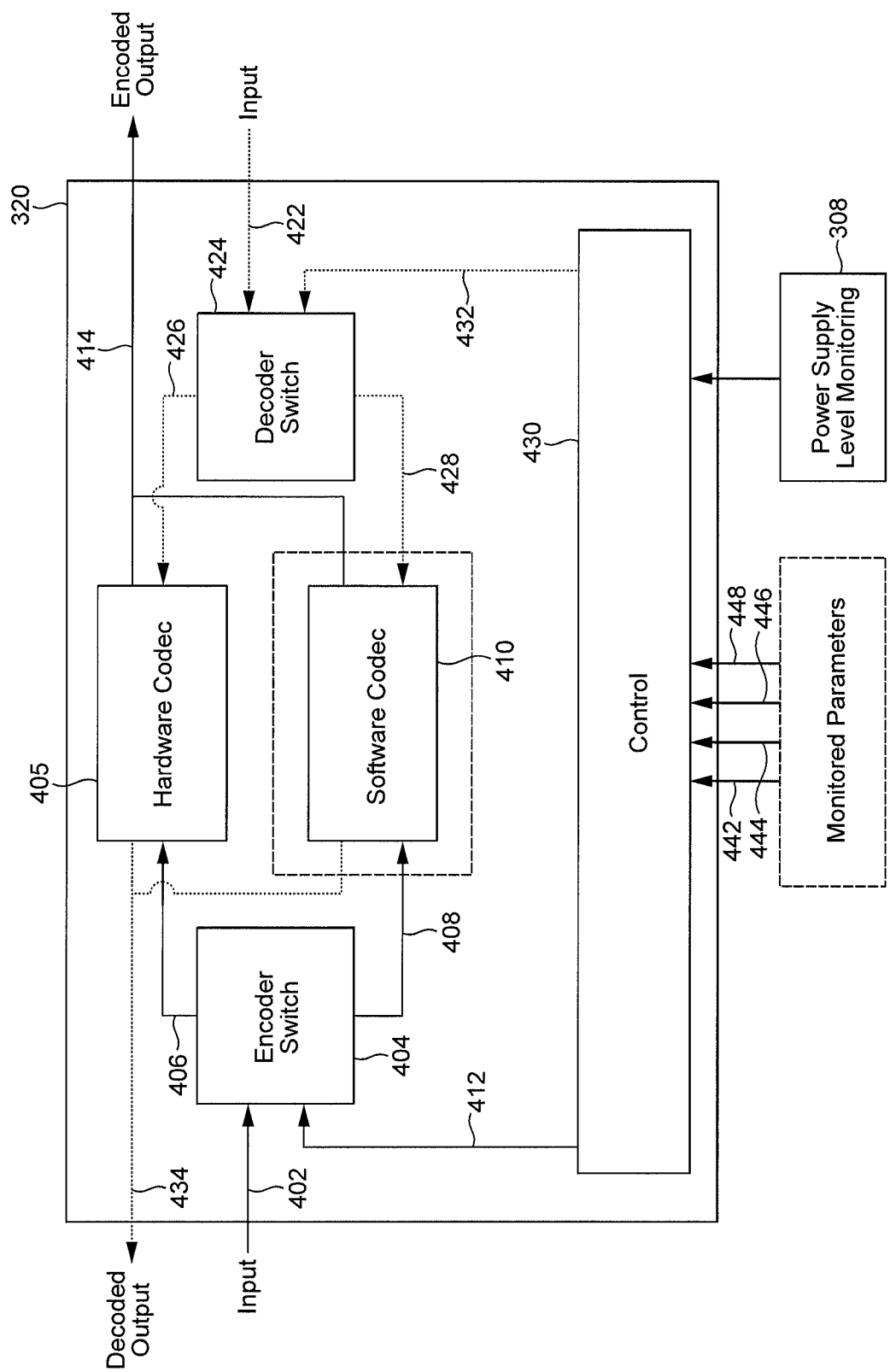
FIG. 4 is a schematic representation of a signal processing module.

Although shown as a separate block for explanatory purposes, as indicated by the dashed lines, the software codec 410 is implemented by executing program code on the CPU 311 (not shown in FIG. 4). The hardware codec 405 is implemented using dedicated circuitry.

A hardware codec uses less power than a software codec, and thus can extend battery life. However a software codec can provide a better quality result in some situations and can be more easily updated. The described embodiments allow the optimum codec to be selected depending on the circumstances through the action of control block 430. The control block 430 is implemented by executing code on the CPU 311, this code may be stored in memory 313 or in a separate memory not shown in FIG. 3. Control block 430 receives monitored network parameters including bit rate 442, transmission delay 444, packet loss rate 446, and the capabilities 448 of remote device 102b, and based on these monitored network parameters outputs control signal 412 to control the encoder switch 404. The capabilities 448 of the remote device 102b may include for example the screen resolution of the remote device 102b or the CPU capabilities of the remote device 102b. As conveyed by the dashed line, parameters 442-448 are monitored by executing the communication client application on the CPU 311. A description of how the control block 430 generates control signal 412 is provided below with reference to FIG. 6.

The signal processing module 320 may also be used to decode an input signal for output to the user 108a of the mobile device 102a during a voice or video call.

An input signal is supplied on line 422 to a decoder switch 424. In operation the input signal may be an encoded audio signal and/or an encoded video signal that is received over the network 101,103 from the remote device 102b.

The decoder switch 424 also receives a control signal 432 from control block 430. A description of how the control block 430 generates control signal 432 is provided below with reference to FIG. 6. The decoder switch 424 operates to output the received input signal on either line 426 to the hardware codec 405, or on line 428 to the software codec 410 in dependence on control signal 432. The selected one of the hardware codec 405 and software codec 410 provides a decoded output signal on line 434. The decoded output signal 434 may be converted to an analogue signal that may be output by the speaker 203 or the display 212.

It will be appreciated that the hardware codec 405 and the software codec 410 can be either a video codec comprising a video encoder and/or a video decoder, or can be an audio codec comprising an audio encoder and/or an audio decoder. The encoders and decoders can be switched independently of each other using encoder switch 404 and decoder switch 424.

Figure 5:
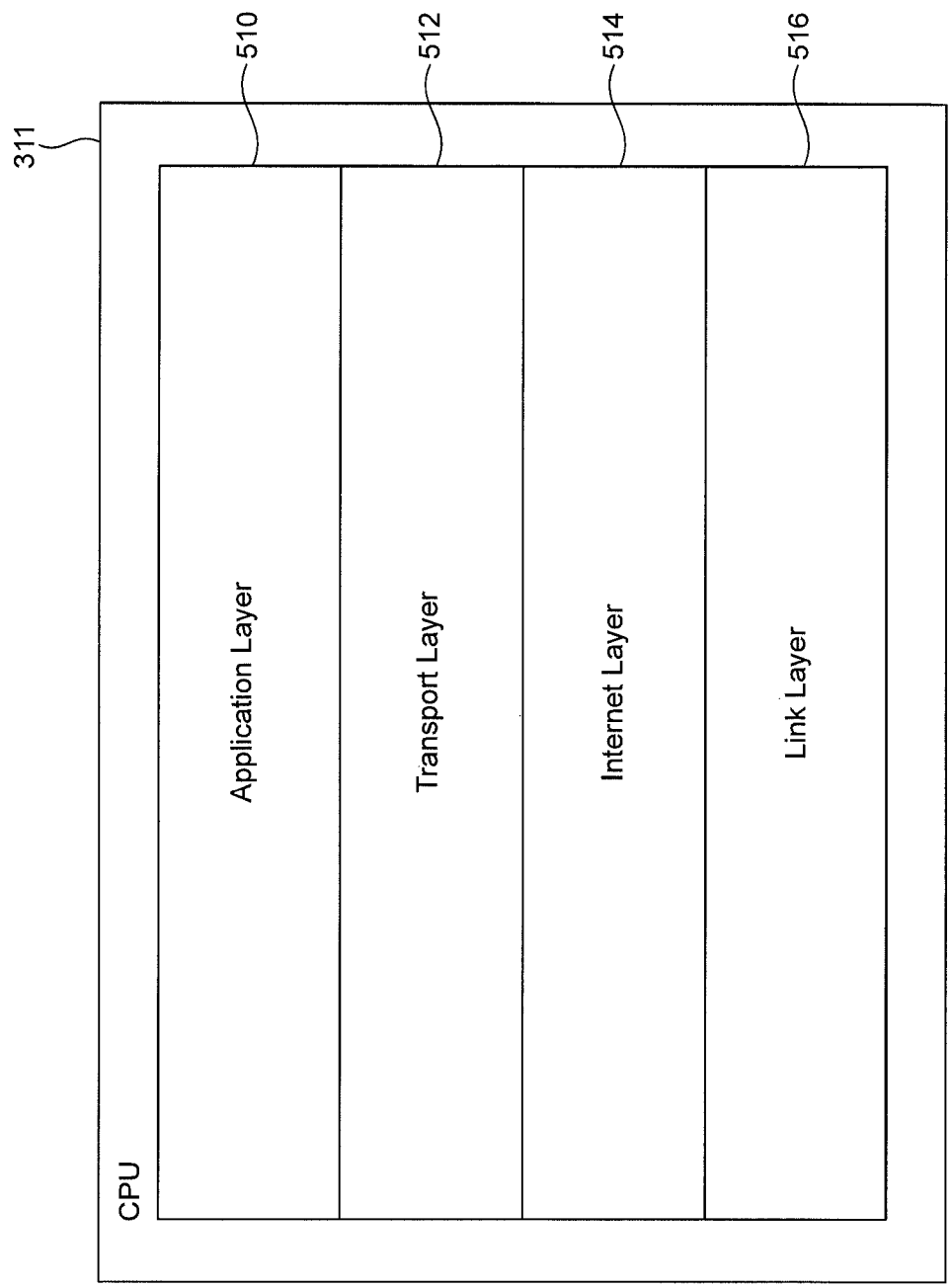
FIG. 5 is a schematic representation of a protocol stack.

In order to describe how parameters 442-448 are monitored, reference is now made to FIG. 5. As will be familiar to a person skilled in the art, the basic mechanism by which user devices can communicate over a network such as the Internet can be considered as a protocol stack (embodied in the software running on each user device). There are a number of different protocol stacks depending on the communication type, but one is shown in FIG. 5 as representative.

In this stack, the lowest layer is the link layer 516 which is responsible for conveying bits over an RF link between devices 102a and 102b. The link layer 316 is responsible for conveying RF traffic in the form of (typically encoded) bits, modulated onto a carrier frequency.

The internet layer 514 is the packet protocol responsible for immediate packet routing. Those skilled in the art will understand that a packet of data comprises both a header portion and a payload. The header comprises the internetwork address (e.g. IP address) of the destination user device, and the payload comprises the actual user data desired by the communication client application to be transmitted. When a routing node receives a packet, its IP layer software examines the IP address and determines the next adjacent routing node to which to route the packet (or end-user terminal device if the destination device is adjacent).

The transport layer 512 adds additional header information wrapped on top of the IP header to provide services such as port numbering, congestion control and acknowledgement of packet receipt.

Finally, the application layer 510 relates to the user information to be included in the packet payload, e.g. audio or video content of a voice or video call, or user text for an IM message. A client application is free to include any content it wishes in the payload as appropriate to the application in question.

The communication client application executed on processor 311 may operate on the transport layer 512 to monitor the end to end transmission delay 444 and the packet loss rate 446. The communication client application may monitor transmission delay using time stamps. Packet loss may be determined using gaps in sequence number of the packets. It will be appreciated that other methods for monitoring this information may be used, for example using network equipment on lower layers. These parameters can be used by the communication client application on the application layer 510 to estimate the available network bandwidth that can be used for the audio/video streams. Furthermore, the communication client application may receive information on the capabilities 448 of the remote device 102b, this may be received in response to a request by the mobile device 102a or as part of the establishment of a call conducted over the link later.

The communication client application supplies the monitored parameters 442-448 to the control block 430, the control block may then evaluate the monitored parameters 442-448 to determine whether to implement the hardware codec 405 or the software codec 410 to process the input signals 402,422.

Figure 6:
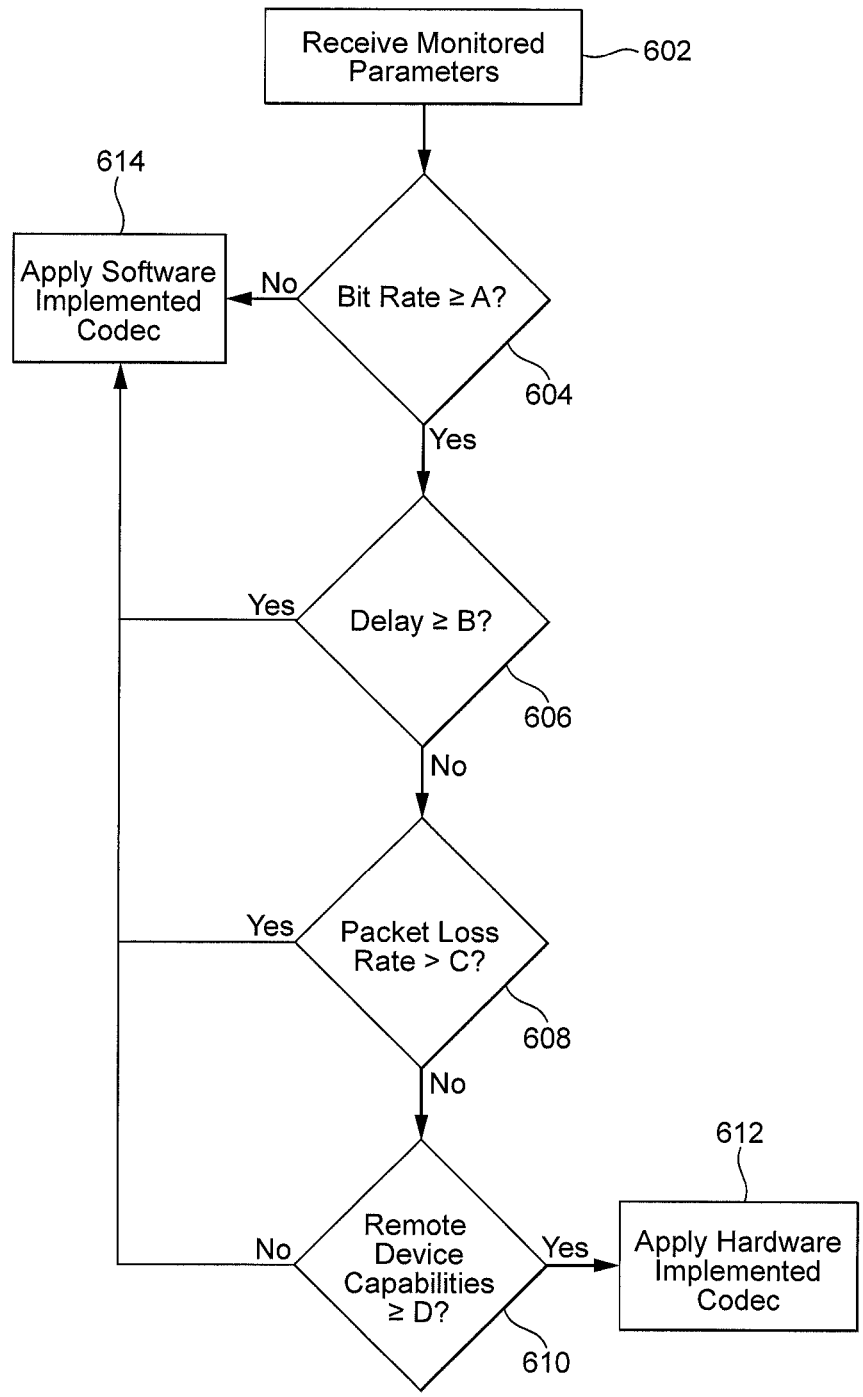
FIG. 6 illustrates a method of determining whether to implement a software codec or a hardware codec.

The inventors have developed logic that the control block 430 implements when determining whether to implement the hardware codec 405 or the software codec 410. The logic used when an input signal must be encoded for transmission is illustrated in FIG. 6. In constructing the logic, the inventors have assumed the following: Firstly, when processing real-time video signals the hardware codec 405 is able to process the input at higher resolutions than the software codec 410 due to constraints of the CPU 311 on which the software codec 410 is implemented.

Secondly, the software codec 410 is easier to update and therefore likely to have more technically advanced features than the hardware codec 405, therefore it is likely to perform better than the hardware codec 405 in low bit-rate, long delay and high packet loss conditions.

Finally, the hardware codec 405 consumes less power from the power supply 306 than the software codec 410.

At step 602, the control block 430 receives the monitored parameters 442-448.

At step 604, the control block 430 determines if the bit rate 442 is greater than, or equal to, a predetermined threshold A. If the bit rate 442 is less than A, at step 614 the control block 430 outputs a control signal 412 that controls the encoder switch 404 to supply the input on line 402 to the software codec 410. The predetermined threshold A should be tuned to the actual hardware codec implementation. One example is 500 kbps.

If it is determined at step 604 that the bit rate 442 is greater than or equal to A the control block 430 proceeds to step 606 where it determines whether the end to end transmission delay 444 is greater than, or equal to, a predetermined threshold B. If the delay 444 is greater than or equal to B, then the control block 430 proceeds to step 614 and operates as described above. Again the predetermined threshold B should be tuned to the actual hardware codec implementation. In one example scenario, a 500 ms end to end delay may be required and if the hardware codec 405 needs 400 ms in order to encode the input on line 402, then the network delay should be less than 100 ms, therefore in this example the threshold value B would be selected to be 100 ms.

If it is determined at step 606 that the delay 444 is less than B the control block 430 proceeds to step 608 where it determines whether the packet loss rate 446 is greater than a predetermined threshold C. If the packet loss rate 446 is greater than C, then the control block 430 proceeds to step 614 and operates as described above. In one example scenario, the predetermined threshold C may be 0% such that the hardware codec 405 is only used when there is no packet loss If the packet loss rate 446 is less than or equal to C the control block 430 proceeds to step 610 where it determines whether the remote device capabilities 448 are greater than, or equal to, a predetermined threshold D. If the remote device capabilities 448 are less than D then the control block 430 proceeds to step 614 and operates as described above. In one example scenario, if the hardware encoder 405 is tuned for VGA resolution and higher resolutions, then at step 610 the process checks whether the CPU of the remote device 102b can handle VGA resolution before the hardware codec 405 is applied.

While packet loss is mentioned, it will be appreciated that other measures of packet loss, such as burstiness could be used.

If it is determined at step 610 that the remote device capabilities are greater than, or equal to D, at step 614, the control block 430 outputs a control signal 412 that controls the encoder switch 404 to supply the input on line 402 to the hardware codec 405.

Thus, the hardware codec 405 is only used when the bit rate 442 is greater than or equal to A, the delay 444 is less than B, the packet loss 446 is less than or equal to C and the remote device capabilities 448 are greater than or equal to D, and if these conditions are not met the software codec 410 is used. Therefore the hardware codec 405 is used when the conditions of the network are good and the remote device 102b can handle the high resolution.

For simplicity, in FIG. 4 a clear separation between the hardware codec 405 and the software codec 410 is shown.

However in some implementations there may not be such a clear separation, for example when a hybrid structure is used where part of the processing is run on a graphics processing unit (GPU). However in these implementations the switching algorithm discussed above with reference to FIG. 6 still applies.

It will be appreciated that, the logic implemented by control block 430 when an encoded input signal must be decoded does not take into account the remote device capabilities 448. Therefore in the decoding process, the hardware codec 405 is used when the conditions of the network are good. That is, the hardware codec 405 is only used when the bit rate 442 is greater than or equal to A, the delay 444 is less than B, and the packet loss 446 is less than or equal C, and if these conditions are not met the software codec 410 is used.

Since network parameters are constantly changing the logic used in FIG. 6 can lead to frequent switching between the hardware codec 405 and the software codec 410. This is undesirable as frequent codec switching results in delay (caused by the switching) and bit-rate overhead. Various different methods may be used in order to prevent frequent codec switching. For example the control block 430 may only output control signal 412,432 to apply a codec switch if more than X seconds has passed since the last codec switch, one example value of X is 10 seconds. In another example, the monitored parameters 442-448 can be averaged over a period of time Y, one example of Y is 5 seconds. In yet another example, statistical metrics may be applied to the network parameters that are monitored over a period of time Y, for example the worst values of the network parameters that are monitored over the period of time Y may be sent to the control block 430.

The predetermined thresholds A, B, C, D used in the logic shown in FIG. 6 can be made adaptive according to the status i.e. power supply level, of the power supply 306. As shown in FIG. 4 the power supply level monitoring block 308 may provide the power supply level of the power supply 306 to control block 430. How the control block uses this information to adaptively change the threshold values A, B, C, D used in FIG. 6 will now be described with reference to FIG. 7.

At step 702, the control block 430 receives the power supply level of the power supply 306 from the power supply level monitoring block 308.

At step 704, the control block 430 determines whether a power cable is connected to the mobile device 102a such that power is being supplied to the power supply 206 (i.e. determines whether the power supply of the mobile device is charging). If a power cable is connected to the mobile device 102a such that power is being supplied to the power supply 306 power utilisation of the codec is not important, then as shown at step 708, a first configuration is used in the process of FIG. 6. That is, values A1,B1,C1,D1 are used in the process of FIG. 6. This first configuration is used to bias the control block 430 to use the software codec 410 as much as possible. During a video call a switch to the hardware codec 405 will only be possible when the remote device 102b is capable of receiving high resolution video. As a mere example, the parameters in the first configuration may take the values A1=1500 kbps, B1=100 ms, C1=0%, D1=HD capable.

If it is determined at step 704 that power is not being supplied to the power supply 306, then at step 706 the control block 430 determines whether the power supply level of the power supply 306 is greater than, or equal to, 60% capacity. If the power supply level of the power supply 306 is greater than, or equal to, 60% capacity then as shown at step 710, a second configuration is used in the process of FIG. 6. That is, values A2,B2,C2,D2 are used in the process of FIG. 6. When the power supply level of the power supply 306 is greater than, or equal to, 60% capacity the software codec 410 is still preferred in most scenarios. Therefore, during a video call the parameters in the second configuration may take the values A2=500 kbps, B2=200 ms, C2=1%, D2=QVGA capable. It will be appreciated that these values are merely examples and are not limiting in any way.

If it is determined at step 706 that the power supply level of the power supply 306 is less than 60% capacity, then as shown at step 712, a third configuration is used in the process of FIG. 6. This third configuration is used to bias the control block 430 to use the hardware codec 405. That is, values A3,B3,C3, D3 are used in the process of FIG. 6. Therefore, during a video call the parameters in the second configuration may take the values A2=500 kbps, B2=200 ms, C2=1%, D2=QVGA capable. It will be appreciated that these values are merely examples and are not limiting in any way.

It will be appreciated that the threshold power supply of 60% is merely an example and is not limiting in any way. Furthermore it will be appreciated that further power supply thresholds may be used in association with additional threshold value configurations.

It is important to note that A,B,C,D are constant values, used to decide when the hardware codec 405 or the software codec 410 should be used, and A1,A2,A3 are different constant values (as are B1,B2,B3 and C1,C2,C3 and D1,D2,D3). All values can be tuned differently for different devices, different cameras, different microphones, and to suit different users (shaky video or talking head video) etc.

Figure 7:
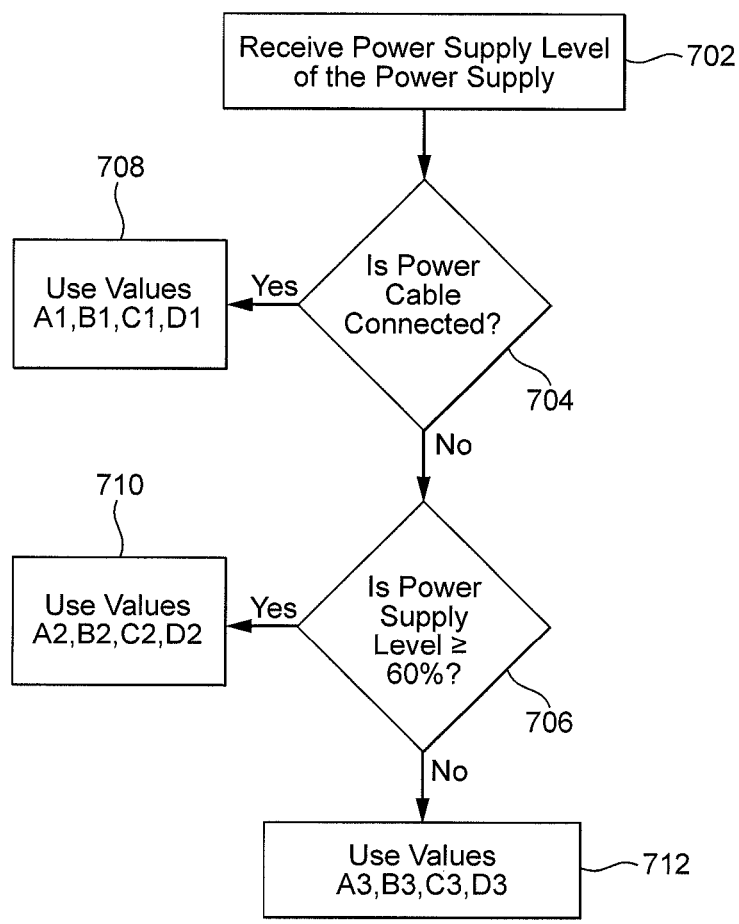
FIG. 7 illustrates a method of determining parameters for use in the method of FIG. 6.

Implementing the methods illustrated in FIGS. 6 and 7 enables a decision to be made whether to use the hardware codec 405 or the software codec 410 on the fly to react to changes in network and battery conditions.

Priority can be given to either the hardware implemented codec 405 or the software codec 410 based on the power supply level of the power supply 306 by selecting the predetermined threshold values of A1,B1,C1,D1; A2,B2,C2,D2 and A3,B3,C3,D3.

When the power supply level of the power supply 306 is low, priority should be given to the hardware codec 405 which uses less battery, similarly when the mobile device is connected to an external power source (i.e. the mobile device is charging) priority should be given to the software codec 410. In order to implement this prioritisation, the constant threshold values may be set as follows:

$A1 \geq A2 \geq A3$ $B3 \geq B2 \geq B1$ $C3 \geq C2 \geq C1$ $D1 \geq D2 \geq D3$ Thus, taking the bit rate threshold values A1,A2,A3 as an example, when the mobile device is connected to an external power source and priority should be given to the software codec 410, the highest threshold value A1 is used in step 604 as the software codec 410 can perform better in low bit rate channel conditions. In contrast, when the power supply level of the power supply 306 is low and priority should be given to the hardware codec 405, the lowest threshold value A3 is used in step 604.

As described above, the methods illustrated in FIGS. 6 and 7 enables the invention to automatically select the best mode of operation. In another embodiment of the invention, a user input received at the mobile device 102a may override the automatic decisions of the control block 430. This user input may be received at input means at the mobile device 102a for example microphone 302 or keypad 309.

In this embodiment the user may select a configuration mode each corresponding to a set of predetermined threshold values. For example a "Best Performance" configuration mode may correspond to predetermined threshold values A1,B1,C1,D1, a "Better Battery" configuration mode may correspond to predetermined threshold values A2,B2,C2,D2 and a "Best Battery" configuration mode may correspond to predetermined threshold values A3,B3,C3,D3. It will be appreciated that the configuration modes may correspond to predetermined threshold values other than those described hereinabove.

In one example scenario the user 108a of mobile device 102a may wish to make an important call and therefore wants a high level of call quality. The user 108a is able to see that the power supply level of power supply 306 is low (i.e. less than 60%) and that the power supply 306 will be able to provide power to the mobile device for a remaining length of time i.e. 30 minutes. In this scenario, the method illustrated in FIG. 7 would automatically use the predetermined threshold values A3,B3,C3,D3 (see steps 706,712). However the user 108a may be aware that the important call will only last 20 minutes. That is, the power supply 306 has sufficient power for the duration of the call. Therefore the user 108a may select the "Best Performance" configuration mode to override the automatic functionality of the control block 430 and select the predetermined threshold values A1,B1,C1,D1 thus achieving the best call quality.

In another example scenario, the user 108a of mobile device 102a may wish to make a call that will be very long in duration. The user 108a is able to see that the power supply level of power supply 306 is high (i.e. greater than 60%). In this scenario, the method illustrated in FIG. 7 would automatically use the predetermined threshold values A2,B2,C2, D2 (see steps 706,710). The user 108a may select the "Best Battery" configuration mode to override the automatic functionality of the control block 430 and select the predetermined threshold values A3,B3,C3,D3 thus achieving the best battery performance to provide sufficient power for the length of the call.

Embodiments of the present invention avoid the need for a trade off to be made during the design and manufacture process between hardware and software. In the past, during the design process of mobile device 102a, many trade-offs needed to be made in order to achieve the best call quality, security or battery performance. A mobile device would be provided with hardware assistant chips in order to improve the battery performance of the mobile device; however the hardware implementations can become outdated and do not achieve the level of call quality that is achieved by software based implementations that may easily be updated.

By allowing a live selection between software and hardware implementations, this trade-off no longer has to be made at the design stage. In addition to video codecs discussed above, the invention can be applied to audio codecs, security related functions or other battery intense functions.

Whilst embodiments of the present invention have been discussed with particular reference to video and/or voice calls, it will be appreciated that applications of the present invention may extend to other mobile video usages, such as live streaming and video mail.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

While this invention has been particularly shown and described with reference to preferred embodiments, it will be understood to those skilled in the art that various changes in form and detail may be made without departing from the scope of the invention as defined by the appendant claims.

What is claimed is:

1. A computer-readable storage memory comprising computer-readable instructions executable by one or more processors of a mobile device for conducting a packet-based call with a remote device via a channel established over a wireless network, the instructions executable to implement:

executing a communication client application to conduct the call and monitor multiple network parameters;

monitoring a power supply level of a power supply;

performing a logical analysis of the multiple network parameters, the logical analysis comprising comparing the multiple network parameters to one of multiple sets of threshold values, the one set of the threshold values being selected for the logical analysis from the multiple sets of the threshold values based on the monitored power supply level; and selectively supplying the call to one of a hardware processing module operable to implement a processing function, or a software processing module executable to implement the processing function, based on the logical analysis of the multiple network parameters and the monitored power supply level.

2. The computer-readable storage memory of claim 1, wherein the multiple network parameters comprise at least one of:

channel bit rate;

channel end-to-end transmission delay;

channel packet loss rate; or channel packet loss burstiness.

3. The computer-readable storage memory of claim 1, wherein said selectively supplying the call to one of the hardware processing module or the software processing module comprises supplying the result of the logical analysis to a selection mechanism configured to supply the call to the hardware processing module or the software processing module.

4. The computer-readable storage memory of claim 3, the instructions further executable to implement:

receiving an input signal at a switch of the selection mechanism;

receiving the result of the logical analysis at a controller of the selection mechanism; and supplying a control signal from the controller to the switch, the control signal based on the logical analysis and the monitored power supply level, the control signal controlling the switch to output the input signal to either the hardware processing module or the software processing module to be processed.

5. The computer-readable storage memory of claim 4, the instructions further executable to implement:
receiving a user input to select a configuration mode, the configuration mode corresponding to a set of constant threshold values; and
responsive to selection of the configuration mode, supplying the control signal using the set of constant threshold values.

6. The computer-readable storage memory of claim 4, wherein the controller controls the switch to output the input signal to be processed, based on the logical analysis comprising a comparison of:
the channel bit rate to a predetermined bit rate threshold;
the channel end-to-end transmission delay to a predetermined delay threshold; and
the channel packet loss rate to a predetermined packet loss rate threshold.

7. A mobile device comprising:
wireless access circuitry configured to access a wireless communication network;
a hardware processing module selectively operable to implement a processing function;
a software processing module selectively executable to implement the processing function;
a power supply;
a power supply monitor to monitor a power supply level of the power supply;
a processor to execute a communication client application to conduct a packet-based call with a remote device via a channel established over the wireless communication network, the communication client application configured to:
monitor multiple network parameters;
perform a logical analysis of the multiple network parameters, the logical analysis comprising comparing the multiple network parameters to one of multiple sets of threshold values, the one set of the threshold values being selected for the logical analysis from the multiple sets of the threshold values based on the monitored power supply level; and
a selection mechanism to supply the packet-based call to one of the hardware processing module and the software processing module based on the logical analysis of the multiple network parameters and the monitored power supply level.

8. A mobile device of claim 7, wherein the processing function is a codec function on one of a video or audio call.

9. The mobile device of claim 7, wherein the multiple network parameters comprise at least one of:
channel bit rate;
channel end-to-end transmission delay;
channel packet loss rate; or
channel packet loss burstiness.

10. The mobile device of claim 7, wherein monitoring multiple network parameters is monitoring at least one transport layer function and at least one application layer function of the communication client application.

11. The mobile device of claim 7, wherein the selection mechanism is further responsive to capabilities of the remote device to select between the hardware processing module and the software processing module.

12. The mobile device of claim 7, wherein the selection mechanism comprises:
a switch configured to receive an input signal; and
a controller configured to:
receive the logical analysis and the monitored power supply level; and
supply a control signal to the switch, the control signal based on the logical analysis and the monitored power supply level, the control signal controlling the switch to output the input signal to either the hardware processing module or the software processing module to be processed.

13. The mobile device of claim 12, wherein the hardware processing module and the software processing module both comprise a video encoder and a video decoder.

14. The mobile device of claim 13, wherein the processor is configured to:
receive real time video data; and
receive the input signal in the form of an unencoded video signal.

15. The mobile device of claim 13, wherein the input signal is an encoded video signal transmitted by the remote device via the channel to the mobile device.

16. The mobile device of claim 12, wherein the hardware processing module and the software processing module both comprise an audio encoder and an audio decoder.

17. The mobile device of claim 16, wherein an audio input device is configured to:
capture audio data; and
supply the input signal in the form of an unencoded audio signal.

18. The mobile device of claim 16, wherein the input signal is an encoded audio signal transmitted by the remote device via the channel to the mobile device.

19. The mobile device of claim 7, wherein the processing function is a security function.

20. The mobile device of claim 7, wherein the wireless communication network is the Internet and wherein the mobile device is one of:
an Internet-enabled mobile telephone;
a handheld game console;
a personal digital assistant (PDA);
a tablet computer; or
a laptop computer.

21. A method of conducting a packet-based call with a remote device via a channel established over a wireless communication network, the method comprising:
executing a communication client application to conduct the call and monitor multiple network parameters;
monitoring a power supply level of a power supply;
performing a logical analysis of the multiple network parameters, the logical analysis comprising comparing the multiple network parameters to one of multiple sets of threshold values, the one set of the threshold values being selected for the logical analysis from the multiple sets of the threshold values based on the monitored power supply level; and
selectively supplying the call to one of a hardware processing module operable to implement a processing function, or a software processing module executable to implement the processing function, based on the logical analysis of the multiple network parameters and the monitored power supply level.

22. The method of claim 21, wherein the multiple network parameters comprise at least one of:
channel bit rate;
channel end-to-end transmission delay;
channel packet loss rate; or
channel packet loss burstiness.

23. The method of claim 21, wherein said selectively supplying the call to one of the hardware processing module or the software processing module comprises supplying the result of the logical analysis to a selection mechanism configured to supply the call to the hardware processing module or the software processing module.

24. The method of claim 23, further comprising:
receiving an input signal at a switch of the selection mechanism;
receiving the result of the logical analysis at a controller of the selection mechanism; and
supplying a control signal from the controller to the switch, the control signal based on the logical analysis and the monitored power supply level, the control signal controlling the switch to output the input signal to either the hardware processing module or the software processing module to be processed.

25. The method of claim 24, further comprising:
receiving a user input to select a configuration mode, the configuration mode corresponding to a set of constant threshold values; and
responsive to selection of the configuration mode, supplying the control signal using the set of constant threshold values.

26. The method of claim 24, wherein the controller controls the switch to output the input signal to be processed, based on the logical analysis comprising a comparison of:
the channel bit rate to a predetermined bit rate threshold;
the channel end-to-end transmission delay to a predetermined delay threshold; and
the channel packet loss rate to a predetermined packet loss rate threshold.

27. The method of claim 26, wherein the controller controls the switch to output the input signal to the software processing module to be processed, when the channel bit rate is less than the predetermined bit rate threshold.

28. The method of claim 26, wherein the controller controls the switch to output the input signal to the software processing module to be processed, when the channel end-to-end transmission delay is greater than, or equal to, the predetermined delay threshold.

29. The method of claim 26, wherein the controller controls the switch to output the input signal to the software processing module to be processed, when the channel packet loss rate is greater than, or equal to, the predetermined packet loss rate threshold.

30. The method of claim 24, wherein the controller controls the switch using a first set of constant threshold values when the monitored power supply level indicates that the mobile device is connected to an external power source.

31. The method of claim 24, wherein the controller controls the switch using a second set of constant threshold values when the monitored power supply level is greater than, or equal to, a predetermined power supply threshold, and the controller controls the switch using a third set of constant threshold values when the monitored power supply level is less than the predetermined power supply threshold.

* * * * *